United States Patent
Thigpen et al.

[15] 3,679,706
[45] July 25, 1972

[54] POLYMERIZATION INHIBITORS FOR ε-CAPROLACTONES

[72] Inventors: Hubert H. Thigpen; Charles C. Hobbs, both of c/o Celanese Corporation, Corpus Christi, Tex.

[22] Filed: April 6, 1970

[21] Appl. No.: 26,049

[52] U.S. Cl. ............................................................. 260/343
[51] Int. Cl. ............................................................ C07d 9/00
[58] Field of Search ................................................ 260/343

[56] References Cited

UNITED STATES PATENTS 3,227,730   1/1966   Goldsmith et al. ..................... 260/343
3,274,216   9/1966   Goldsmith et al. ..................... 260/343

Primary Examiner—John M. Ford
Attorney—Thomas J. Morgan, Marvin Turken and Kenneth A. Genoni

[57] ABSTRACT

Disclosed herein is a process for inhibiting the production of polymeric ε-caprolactones in the oxidation of cyclohexanones to produce monomeric ε-caprolactones. The cyclohexanones are reacted with a suitable oxidizing agent such as peracetic acid in the presence of certain polymerization inhibitors such as isocyanates.

8 Claims, No Drawings

POLYMERIZATION INHIBITORS FOR ε-CAPROLACTONES

DISCUSSION OF THE PRIOR ART

It is well recognized that it is difficult to prepare monomeric ε-caprolactones to the exclusion of polymeric ε-caprolatones. The art, e.g. U.S. Pat. No. 3,064,008, recognizes that it is desirable to utilize an anhydrous system in order to minimize the degree of polymerization of the caprolactones. Removing water from the system, however, is in many instances unattractive from an economic point of view. In particular, water removal can increase the costs of constructing and operating recovery equipment which, in certain circumstances, must be operated at pressures less than atmospheric.

SUMMARY OF INVENTION

Water in the system hydrolyzes the monomeric ε-caprolactones to form the corresponding hydroxy acid. For example, in the following reaction, ε-hydroxycaproic acid is formed:

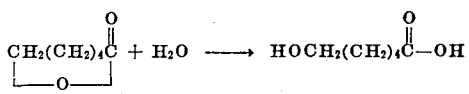

It has now been discovered that the small amount of hydroxy acid thus produced is the primary polymerization initiator in the process reaction and recovery systems; and that the degree of polymerization can be reduced by adding an inhibitor, e.g. isocyanates, to inactivate the active hydroxyl group of the hydroxy acid.

The hydroxyl group attached to the methylene group is herein referred to as the active hydroxyl group. The active hydroxyl group can open the lactone ring to begin a polymer chain with the initiating groups regenerated in each step. The hydroxycaproic acid is relatively nonvolatile and therefore the acid remains with the ε-caprolactone in the reaction tower reboiler at high temperatures at which polymerization occurs. In accordance with this invention, polymerization is inhibited by reacting an inhibitor, preferably an organic isocyanate with the above-mentioned acid to inactivate the active hydroxyl group of said acid, thereby preventing said hydroxyl group from initiating polymerization by opening the ring of the monomeric ε-caprolactone.

DETAILED DESCRIPTION OF INVENTION

Monomeric ε-caprolactones can be prepared, as is known to the art, by the oxidation of cyclohexanone with peracetic acid. Cyclohexanone, peracetic acid and a suitable solvent such as ethyl acetate are fed to a column for the reaction. The solvent, some water and acetaldehyde (brought in with the peracetic acid in some instances) are drawn off overhead and the monomeric caprolactone and certain other products such as adipic acid gather in the reboiler of this reaction column. Monomeric ε-caprolactone is subsequently separated by further distillation in additional distillation units. It has been discovered that some of the polymerization may occur in the reaction column reboiler (if residence time is long), but most of the polymerization occurs in the reboilers of said additional distillation units.

It has now been discovered that the degree of polymerization can be reduced significantly by adding an inhibitor to the system that inactivates the active hydroxyl group formed by the hydrolysis of caprolactone by water in the system. If these inhibitors are not used, one must design a recovery system having relatively low temperatures and pressures, for polymerization is increased at high temperatures. Such design increases cost of construction and complexity of operation. A variety of inhibitors can be employed. As soon as those skilled in the art are apprised of the fact that it is the active hydroxyl group of the hydroxy acid that increases the rate of polymerization and learn of the invention described herein, they will be able to determine a variety of inhibitors that will be operable. The inhibitor must react with the hydroxy acid to inactivate the hydroxyl group; it should itself be, and form compounds with the hydroxy acid that are, readily separable from the reaction mixture; and it should not have a deleterious effect on the oxidation of the cyclohexanone by the peracetic acid; if the inhibitor adversely affects the main reaction, one may add it to the reaction mixture after said mixture is removed from the reaction column reboiler but before said mixture is injected into the aforementioned additional distillation units for separation. This technique is effective because most of the polymerization occurs in said additional distillation units, the recovery system.

Organic isocyanates fulfill the above stated requirements, provided the compound contains a reactive isocyanate group, NCO. Thus materials such as the bisphenol adduct of methylenebis (4-phenyl isocyanate) are unsuitable because the isocyanate group is tied up and is not free to react.

Organic mono-, di-, and tri-isocyanates are suitable provided the compound contains at least one reactive isocyanate group. As seen from the compounds listed below, the isocyanate group may be attached to any of a large variety of organic moieties including aromatic, cyclic, straight or branched chain alkyl, which moieties can be saturated or unsaturated, unsubstituted or substituted with groups such as nitro or halo. In certain cases it is preferred to have a substituted moiety, for such materials, e.g. nitrophenyl isocyanate, react faster than the unsubstituted material. The following is a nonexhaustive list of suitable organic isocyanates: 2,4 and 2,6 toluene diisocyanates and mixtures thereof, diphenylmethane- 4,4'-diisocyanate, polyalkylene polyphenyl isocyanates, dianisidine diisocyanate, methaphenylene diisocyanate, phenyl isocyanate, o-m-, and p-chlorophenyl isocyanates, 2,5-dichlorophenyl isocyanate, 3,4dicholorophenyl isocyanate; alkyl isocyanates such as methyl, ethyl, propyl, isopropyl, octadecyl, etc. isocyanates; cyclohexyl isocyanate, hexamethylene diisocyanate, tolidine diisocyanate, 3,4' dimethyl 4,4' biphenylene diisocyanate, 3,3'-dimethoxybenzidine-4,4'-diisocyanate, 3,3' bitolylene-4,4' diisocyanate; 4-(p-isocyanatophenoxy)-m phenylene isocyanate, p-toluene sulfonyl isocyanate, triphenylmethane triisocyanate, and trans-vinylene diisocyanate. It will be clear to those skilled in the art that other materials, acetic anhydride to name only one, will be useful.

The amount of inhibitor required to decrease significantly the polymerization of the ε-caprolactone will depend upon the amount of water present in the reaction mixture. If the concentration of water in the reaction mixture (reaction column reboiler) is from 0.3 to 3.0 percent by weight, one should add the inhibitor in a concentration of from 0.5 to 5.0 percent by weight either to the mixture in the reaction column reboiler, or to the mixture after it is removed from said reboiler but before it is injected into the distillation units for separation of the product.

The following examples demonstrate the effect water has on the polymerization rate of ε-caprolactone and demonstrate the efficacy of the inhibitors of the invention.

EXAMPLE I

The undesirable acceleration of epsilon caprolactone polymerization by water was demonstrated as follows. Blends prepared to simulate typical product mixtures were processed to recover an epsilon caprolactone-adipic acid product stream. The blends, containing 0.12 percent water and 0.5 percent water respectively were as follows:

| Component | Wt% | |
|---|---|---|
| | Blend No. 1 | Blend No. 2 |
| Water | 0.12 | 0.5 |
| Ethyl acetate | 61.3 | 60.9 |
| Acetic acid | 11.0 | 11.0 |
| Cyclohexanone | 11.0 | 11.0 |
| Adipoin | 0.03 | 0.03 |
| ECL | 16.0 | 16.0 |
| Adipic acid | 0.6 | 0.6 |

The work up procedure was to reflux the blends at 400 mm HgA (73° C.) for 1.5 hours and at atmospheric pressure (90° C.) for 30 minutes to simulate residence time in the finishing reactor. The mixture was then continuously flashed in a thermosiphon reboiler at 400 mm HgA and 85° C. base temperature; the base residence time was 7 minutes. The base stream from the flasher was continuously distilled at 150 mm HgA overhead pressure and 3 to 1 reflux ratio in a 30 tray, 1 inch Oldershaw column. The column was fed at Tray 22 and a mixture of ECL and adipic acid was taken as a base stream (3.6 wt % adipic acid). The reboiler temperature was 176° C. and the base residence time was about 10 minutes. The polymerization rate of the recovered mixture from the reaction product blend containing 0.12 wt % water was only 3.6% per hour at 176° C. while a similar mixture recovered from the blended product mixture containing 0.5 percent water had a polymerization rate of 50 percent per hour at 176° C. The latter rate (50 percent per hour) is higher than was found for similar mixtures recovered from actual runs (8–15 percent per hour) with about the same amount of water present in the original reaction mixtures (0.3–0.5 wt % water). This difference could be due to the variations in length of time the reaction products stood at room temperature between work up steps. In any event, it is clear from these tests that water accelerates polymerization.

The above tests, other similar tests, experience with the actual process and an investigation of the process mechanisms led to the conclusion that the active hydroxyl group on the hydroxy acid formed by the hydrolysis of epsilon caprolactone caused the continued polymerization of the monomer.

EXAMPLE II

Tests were performed that demonstrate that organic isocyanates having a reactive isocyanate group significantly diminish the rate of the undesired polymerization. The isocyanates react rapidly with the hydroxyls present. Thus, the most active polymerization initiating group can be rendered inactive. An epsilon caprolactone- adipic acid mixture (3.0 wt. % adipic acid), obtained from a reaction product mixture, containing about 2 percent water had a high polymerization rate of 20 percent per hour at 176° C. Samples of the same mixture containing 0.12 wt. % phenyl isocyanate and 0.4 wt. % phenyl isocyanate were then tested. The smaller amount of phenyl isocyanate did not decrease the rate of polymerization. But the 0.4 wt. % decreased the rate down to only 13 percent per hour. This rate can be further reduced by increasing the concentration and by utilizing more active isocyanates, e.g. nitro phenyl isocyanate.

The inhibitors described herein are useful in the production of ε-caprolactones and alkyl substituted ε-caprolactones of the following general formula:

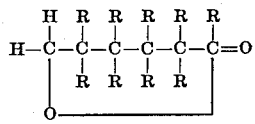

wherein from one to four R's represent alkyl groups, the remainder being hydrogen atoms, and the total number of carbon atoms in the alkyl groups does not exceed 12.

Among the alkyl-substituted epsilon-caprolactones within the scope of this invention are:
Alpha-methyl-epsilon-caprolactone; Beta-methyl-epsilon-caprolactone; Gamma-methyl-epsilon-caprolactone; Delta-methyl-epsilon-caprolactone; Alpha-ethyl-epsilon-caprolactone; Beta-ethyl-epsilon-caprolactone; Gamma-ethyl-epsilon-caprolactone; Delta-ethyl-epsilon-caprolactone; Alpha,beta-dimethyl-epsilon-caprolactone; Alpha, gamma-dimethyl-epsilon-caprolactone; Alpha,delta-dimethyl-epsilon-caprolactone; Beta,gamma-dimethyl-epsilon-caprolactone; Beta,delta-dimethyl-epsilon-caprolactone; Gamma, delta-dimethyl-epsilon-caprolactone; Beta,beta,delta-trimethyl-epsilon-caprolactone; Beta, delta,delta-trimethyl-epsilon-caprolactone; Alpha,beta,gamma-trimethyl-epsilon-caprolactone; Alpha,beta,delta-trimethyl-epsilon-caprolactone; Beta,gamma,delta-trimethyl-epsilon-caprolactone; Alpha-ethyl-beta-methyl-epsilon-caprolactone; Alpha-ethyl-gamma-methyl-epsilon-caprolactone; Alpha-ethyl-delta-methyl-epsilon-caprolactone; Beta-ethyl-alpha-methyl-epsilon-caprolactone; Beta-ethyl-gamma-methyl-epsilon-caprolactone; Beta-ethyl-delta-methyl-epsilon-caprolactone; Gamma-ethyl-alpha-methyl-epsilon-caprolactone; Gamma-ethyl-beta-methyl-epsilon-caprolactone; Gamma-ethyl-delta-methyl-epsilon-caprolactone; Delta-ethyl-alpha-methyl-epsilon-caprolactone; Delta-ethyl-beta-methyl-epsilon-caprolactone; Delta-ethyl-gamma-methyl-epsilon-caprolactone; Alpha,alpha-dimethyl-epsilon-caprolactone; Beta-beta-dimethyl-epsilon-caprolactone; Gamma,gamma-dimethyl-epsilon-caprolactone; Delta,delta-dimethyl-epsilon-caprolactone; Alpha,alpha,delta-trimethyl-epsilon-caprolactone; Beta,beta,gamma,trimethyl-epsilon-caprolactone; Alpha,delta,delta-trimethyl-epsilon-caprolactone; Beta,beta-dimethyl-gamma-ethyl-epsilon-caprolactone; Delta,delta-dimethyl-alpha-ethyl-epsilon-caprolactone.

Still other alkyl-substituted epsilon-caprolactones can be produced wherein the alkyl substituent can be, for example, propyl, isopropyl, butyl, isobutyl, tertiary, butyl, amyl, isoamyl, hexyl, heptyl, octyl, nonyl, decyl, undecyl and dodecyl groups. Typical representative compounds containing higher alkyl groups are gamma-isopropyl-epsilon-caprolactone, gamma-(2-ethylhexyl)-epsilon-caprolactone.

The above described epsilon-caprolactones are prepared by reacting cyclohexanone or an alkyl substituted cyclohexanone with an oxidizing agent selected from the group consisting of acetaldehyde monoperacetate and peracetic acid.

The caprolactones have a variety of uses such as in the production of acids, polyester gum stocks, cured elastomers and the like.

What is claimed is:

1. In a process for inhibiting the production of polymeric ε-caprolactones in the oxidation of a cyclohexanone to produce monomeric ε-caprolactones wherein water present in the system hydrolizes a portion of the monomeric ε-caprolactones to the corresponding hydroxy acid, the improvement comprising reacting an inhibitor selected from the group consisting of acetic anhydride, a $C_1 - C_{20}$ alkyl isocyanate having at least one reactive isocyanate group, and phenyl isocyanate with said acid to inactivate the active hydroxyl group of said acid, thereby preventing said hydroxyl groups from initiating polymerization.

2. Process according to claim 1 wherein said inhibitor is a $C_1 - C_{20}$ alkyl isocyanate.

3. Process according to claim 1 wherein said inhibitor is phenyl isocyanate.

4. The process of claim 1 wherein said inhibitor is acetic anhydride.

5. In a process for producing monomeric ε-caprolactones by the oxidation of a cyclohexanone selected from the group consisting of cyclohexanone and lower alkyl substituted cyclohexanones in a system containing from 0.3 to 5 percent water, the improvement comprising adding in an amount sufficient to inhibit the formation of polymeric ε-caprolactones an inhibitor selected from the group consisting of acetic anhydride, a $C_1 - C_{20}$ alkyl isocyanate having at least one reactive isocyanate group, and phenyl isocyanate.

6. A process according to claim 5 wherein said inhibitor is acetic anhydride.

7 The process of claim 5 wherein said organic isocyanate is a $C_1$ to $C_{20}$ alkyl isocyanate.

8. The process of claim 5 wherein said organic isocyanate is phenyl isocyanate.

* * * * *